United States Patent
Domnick et al.

(10) Patent No.: US 6,792,765 B2
(45) Date of Patent: Sep. 21, 2004

(54) CHILLING SYSTEM AND METHOD

(76) Inventors: Frank L. Domnick, 34204 S. Steaman Ct., Tracy, CA (US) 95377; Bruce A Elliott, 14600 Wyrick Ave., San Jose, CA (US) 95124

( * ) Notice: Subject to any disclaimer, the term of this patent is extended or adjusted under 35 U.S.C. 154(b) by 12 days.

(21) Appl. No.: 10/309,868

(22) Filed: Dec. 4, 2002

(65) Prior Publication Data

US 2004/0035126 A1 Feb. 26, 2004

Related U.S. Application Data

(60) Provisional application No. 60/405,435, filed on Aug. 23, 2002.

(51) Int. Cl.[7] .............................................. F25B 15/00
(52) U.S. Cl. .............................. 62/141; 62/148; 62/476
(58) Field of Search .......................... 62/141, 146, 148, 62/476, 480, 481, 483

(56) References Cited

U.S. PATENT DOCUMENTS

| | | | | |
|---|---|---|---|---|
| 5,083,438 A | * | 1/1992 | McMullin | 62/129 |
| 5,946,926 A | * | 9/1999 | Hartman | 62/201 |
| 6,446,941 B1 | * | 9/2002 | Maheshwari et al. | 261/130 |
| 6,532,754 B2 | * | 3/2003 | Haley et al. | 62/129 |

OTHER PUBLICATIONS

"Using Variable Speed Drives Technology to Reap Rewards of Efficient HVAC Design", Printed on Nov. 24, 2002; 2 pages.

Kirsner, Wayne; "The Demise of the Primary–Secondary Pumping Paradigm for Chilled Water Plant Design"; HPAC (Heating/Piping/Air Conditioning); Nov. 1996; 5 pages.

Hartman, Thomas; "Getting Real About Low Delta T in Variable–Flow Distribution Systems"; HPAC Engineering; Apr. 2001; 1 page.

"Improving the Efficiency of Chilled Water Plants"; Reprinted from May 2001 ASHRAE Journal; Solutions Engineering Technical Bulletins; 6 pages; issue #00–12.

* cited by examiner

Primary Examiner—Melvin Jones
(74) Attorney, Agent, or Firm—Squire, Sanders & Dempsey L.L.P.; Aaron Wininger

(57) ABSTRACT

A chiller system comprises a chiller, a burner, a first variable frequency driver and pump, a second frequency drive and pump, and a feedback system. The chiller has a chilled water input and a cooling water input and the burner is coupled to the chiller. The first variable frequency drive and pump is coupled to the chilled water input. The second variable frequency drive and pump is coupled to the cooling water input. The feedback system is coupled to the burner, the first variable frequency drive, and the second variable frequency drive. The feedback system capable of measuring a characteristic of the burner that is proportional to the cooling load of the chiller system and transmitting a signal corresponding determined characteristic to the first and second variable frequency drives.

28 Claims, 4 Drawing Sheets

CHILLING SYSTEM AND METHOD

PRIORITY REFERENCE TO PRIOR APPLICATIONS

This application claims benefit of and incorporates by reference U.S. patent application Ser. No. 60/405,435, entitled "CHILLING SYSTEM AND METHOD," filed on Aug. 23, 2002, by inventors Frank L. Domnick and Bruce A. Elliott.

TECHNICAL FIELD

This invention relates generally to chillers, and more particularly, but not exclusively, provides a system and method for increasing the efficiency of chillers.

BACKGROUND

Absorption chillers provide chilled water for use in a range of industries including the plastics industry; the printing industry; the magnetic resonance imaging (MRI) industry; the heating, ventilating, and air conditioning (HVAC) industry; and the laser cutting industry. In HVAC applications, absorption chillers pump chilled water to air handling units (AHUs) in buildings, such as warehouses and high-rise buildings. The AHUs for each section of the building open and close to let the chilled water flow through so as to keep the section at a desired temperature.

FIG. 1 is a block diagram illustrating a conventional single stage absorption chiller 100. The chiller 100 includes a generator 105; a separator 110; a condenser 120; an expansion valve 130; an evaporator 140; an absorber 150; and a heat exchanger 160, each coupled in series, respectively. The chiller 100 enables the chilling of water via absorbing and then releasing water vapor into and out of a lithium bromide (LiBr) solution. A heat source, such as a natural gas burner, applies heat to the generator 105, which contains LiBr and a refrigerant, such as water, in liquid form. The LiBr and refrigerant phase change to a vapor state and are then separated in the separator 110. The LiBr is transferred to the absorber 150 via the heat exchanger 160, in which the LiBr is phase changed back to liquid form.

The refrigerant, in vapor form, is transferred to the condenser 120, within which cooling water circulates in pipes. The cooling water can be supplied from a utility company, water tower, or other water source. The condenser 120, using the cooling water, cools the refrigerant vapor and transfers it to the evaporator 140 via the expansion valve 130. The expansion valve 130 reduces the pressure of the refrigerant vapor.

The evaporator 140 then transfers ambient heat from the chilled water received from an application (e.g., AHUs) to the water vapor. Accordingly, the chilled water is then cooled and returned to the application. For example, the chilled water may enter the evaporator 140 at 54° Fahrenheit and may leave the evaporator 140 at 44° Fahrenheit.

The refrigerant then leaves the evaporator 140 and recombines with the LiBr in the absorber 150, within which cooling water circulates, which causes the refrigerant to change state back to a liquid form. The LiBr and refrigerant are then transferred to the generator 105 (via the heat exchanger 160) to repeat the above-mentioned process.

Conventional chillers, such as chiller 100, are very efficient compared to other mechanisms used to cool buildings. In addition, conventional chillers use water as a refrigerant, instead of environmentally damaging chloro-fluoro-carbons (CFCs). However, conventional chillers do exhibit some inefficiencies. For example, chilled water and cooling water are generally pumped into and out of conventional chillers at fixed rates, regardless of the load. The same amount of electricity might be used to pump chilled water and cooling water on a cool day as on a hot day. Further, valves located between the pumps and the chiller limit the inflow of water, thereby wasting energy on pumping.

As shown in FIG. 2., one technique of overcoming the above-mentioned deficiency is to install a transducer feedback mechanism that controls the pumps. FIG. 2 is a block diagram illustrating a chiller system 200 that includes a transducer feedback mechanism. The chiller system 200 includes a chiller, e.g., chiller 100; a pump 210; a variable frequency drive (VFD) 220; a valve 205; a transducer 260; AHUs 230, 240, and 250; and corresponding valves 270, 280 and 290. The pump 210 is controlled by the VFD 220, which receives load feedback from transducer 260. The pump 210 is in fluid communication with chiller 100 via the valve 205 and the AHUs 230, 240 and 250. The valve 205 limits water flow into the chiller 100 so as to prevent pipe erosion.

During operation of the chiller system 200, pump 210 pumps chilled water into chiller 100 to the valves 270, 280 and 290. If valve 270 is open, then chilled water will flow to AHU 230. Similarly, if valve 280 is open, then chilled water will flow to AHU 240. If valve 290 is open, chilled water will flow to AHU 250. After the chilled water flows through the AHUs 230–250 (if their respective valves are open), the chilled water returns to the chiller 100. If all the valves 270, 280 and 290 are closed, then no chilled water will flow to the AHUs 230, 240 and 250 and the chilled water will return to the chiller 100 via a bypass 255.

The transducer 260 measures the differential pressure at points A and B. The transducer 260 then transmits a signal proportional to the differential pressure to the VFD 220 via a relay 225 to either increase or decrease the rate that pump 210 pumps chilled water. However, the differential pressure measured by the transducer 260 is not necessarily related to the load. For example, if all the valves 270, 280 and 290 are closed, the transducer 260 may measure a differential pressure not indicative of the actual load. Accordingly, the transducer 260 may cause the VFD 220 to drive the pump 210 at greater speeds than required, thereby wasting electricity. In addition, the transducer 260 is susceptible to dirt (causing erratic control of the chiller 100) and often fails.

Accordingly, a new absorption chiller system and method is required that solves the above-mentioned deficiency.

SUMMARY

The present invention provides a system for increasing the efficiency of a chiller. The system comprises a chiller, a burner, a first variable frequency driver and pump, a second frequency drive and pump, and a feedback system measuring burner characteristics. The chiller has a chilled water input and a cooling water input and the burner is coupled to the chiller. The first variable frequency drive and pump is coupled to the chilled water input. The second variable frequency drive and pump is coupled to the cooling water input. The feedback system is coupled to the burner, the first variable frequency drive, and the second variable frequency drive. The feedback system is capable of measuring a characteristic of the burner that is proportional to the cooling load of the chiller system and then transmitting a signal corresponding determined characteristic to the first and second variable frequency drives.

In an embodiment of the invention, the feedback system includes a potentiometer that is capable of determining a position of a modulating motor of the burner.

In another embodiment of the invention, the feedback system includes a potentiometer that is capable of determining a position of an energy input valve of the burner.

The present invention further provides a method for improving the efficiency of a chiller system. The method comprises: determining a characteristic corresponding to a cooling load of a chiller; and transmitting, to a variable frequency drive, a signal corresponding to the characteristic, wherein the variable frequency drive is coupled to a chilled water pump. In another embodiment of the invention, the method further comprises transmitting, to a second variable frequency drive, a signal corresponding to the characteristic, the second variable frequency drive coupled to a cooling water pump.

Therefore, the system and method may advantageously increase the efficiency of a chiller system.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
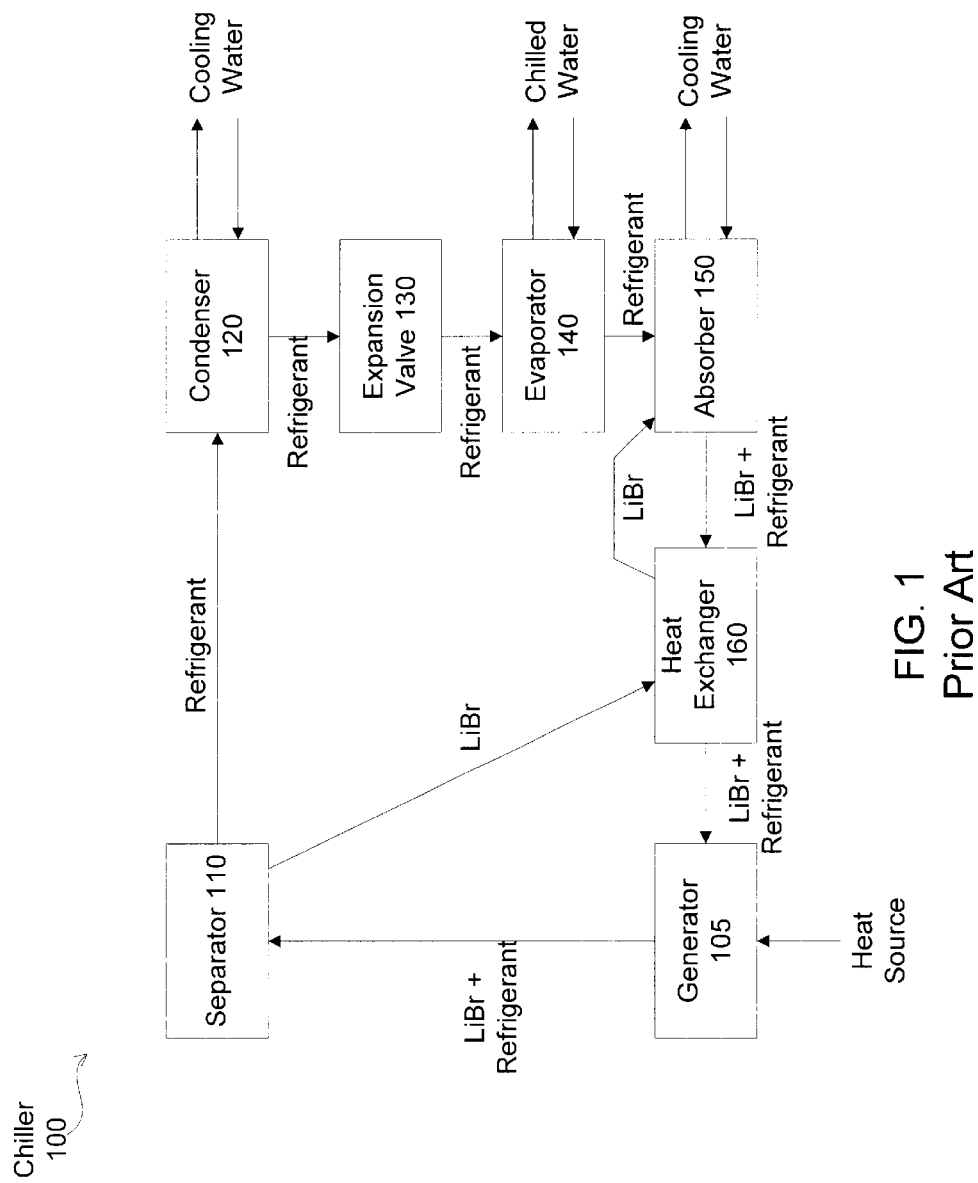
FIG. 1 is a block diagram illustrating a conventional single stage absorption chiller.
Figure 2:
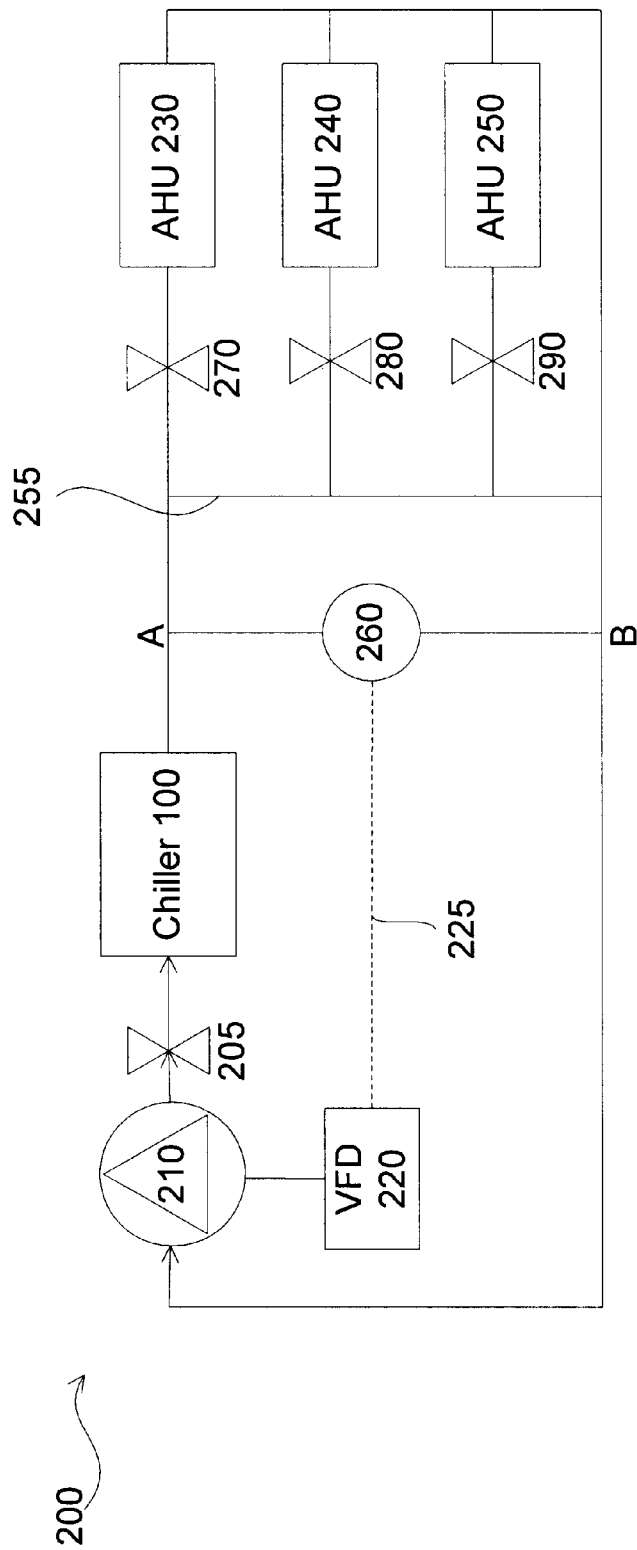
FIG. 2 is a block diagram illustrating a conventional chiller system that includes a transducer feedback system.
Figure 3:
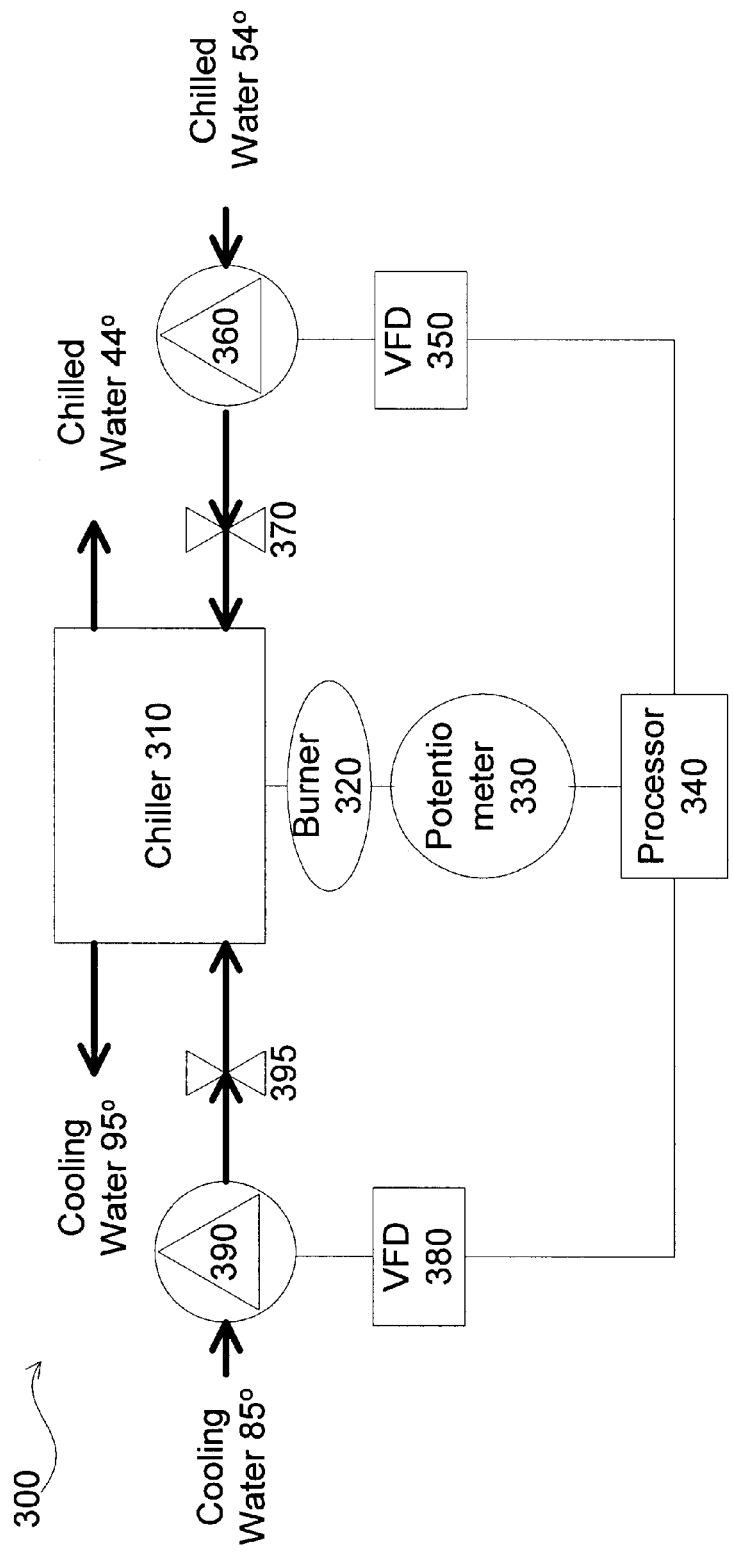
FIG. 3 is a block diagram illustrating a chiller system according to an embodiment of the invention.

FIG. 3 is a block diagram illustrating a chiller system 300 according to an embodiment of the invention. The chiller system 300 comprises a chiller 310; a burner 320; a potentiometer 330 (e.g., a Honeywell potentiometer Q181A1007); a microprocessor 340 (e.g., a Advanced Control Technologies Adjustable Rescaling Module); a VFD 350 (e.g., an ABB or Saftronics VFD); a pump 360; a valve 370; a second VFD 380 (e.g., an ABB or Saftronics VFD); a second pump 390; and a second valve 395. The chiller 310 may be substantially similar to the chiller 100 described above. The burner 320 may be powered by natural gas and is coupled to the chiller 310.

The potentiometer 330 is mechanically coupled to a modulating motor of the burner 320 and/or to an energy input valve of the burner 320. Further, the potentiometer 330 is communicatively coupled to the microprocessor 340. The potentiometer 330 tracks the position of the energy input valve and/or modulating motor, which is directly proportional to the cooling load on the chiller 305. The potentiometer 330 transmits a 24 Volts Alternating Current (VAC) signal to the microprocessor 340 that is based on the position of the energy input valve or the modulating motor.

The microprocessor 340 is coupled to the VFD 350 and the VFD 380. The microprocessor 340 receives the signal from the potentiometer 330 and converts the signal into a proportional signal (in 2–10 volts direct current or 4–20 milliamps). The potentiometer 330 then transmits this proportional signal to the VFDs 350 and 380. This proportional signal causes the VFDs 350 and 380 to either increase or decrease their speed based on the cooling load. However, the VFDs 350 and 380 will not exceed or go below preset maximum and minimum flow settings so as to prevent damage to the chiller 310. Accordingly, the valves 370 and 395 can be fully opened. Exceeding flow settings can cause pipe erosion in the chiller 310 and going below minimum flow settings cause components within the chiller 310 to freeze (due to the low temperature).

The VFD 350 is coupled to the pump 360, which pumps chilled water from an application (e.g., AHUs) to the chiller 310. In one example, the chilled water enters the chiller 310 at 54° Fahrenheit. The chiller 310 cools the chilled water to 44° Fahrenheit and then transmits it back to the application. The VFD 380 is coupled to the pump 390, which pumps cooling water from a cooling source (e.g., water tower) to the chiller 310. In an example, the cooling water enters the chiller 310 at 85° Fahrenheit and leaves the chiller 310 at 95° Fahrenheit. The valves 370 and 395 are opened 100% so that the full energy savings of the chiller system 300 can be appreciated. For example, a centrifugal pump running at 50% capacity and 50% speed will use only 12.5% of power requirements compared to a pump running at 10% capacity and 100% speed.

It will be appreciated by one of ordinary skill in the art that additional VFDs may be added to the chiller system 300. For example, VFDs can be integrated with the application (e.g., AHUs). In addition, it will be appreciated that the ramping up and ramping down of the VFDs 350 and 380 are always proportional to the ramping up and ramping down (respectively) of the burner 320. It will be further appreciated that the valves 370 and 395 can be removed in chilling system 300, thereby reducing costs by eliminating components.

In another embodiment of the invention, the potentiometer 330 can be coupled instead to a chilled water sensor that measures the temperature of the chilled water as it enters and/or exits the chiller 310. In another embodiment the invention, the burner 320 can be powered by other energy sources, such as oil. Further, a steam or hot water unit can be used in place of the burner 320. In yet another embodiment of the invention, the chiller 310 can include a centrifugal chiller in place of an absorption chiller.

In one embodiment of the invention, a no fire relay (not shown) can also be communicatively coupled the burner 320 and the microprocessor 340. The no fire relay transmits a signal to the microprocessor confirming the burner 320 is firing (e.g., the gas valve is open). If the burner 320 is not firing, then the no fire relay does not transmit a signal to the microprocessor 340 and the microprocessor 340 in turn does not transmit a signal to the VFD 380 that corresponds to the burner 320 modulating motor position. Instead, the microprocessor 340 transmits a signal to the VFD 380 to further reduce speed of the pump 390.

Figure 4:
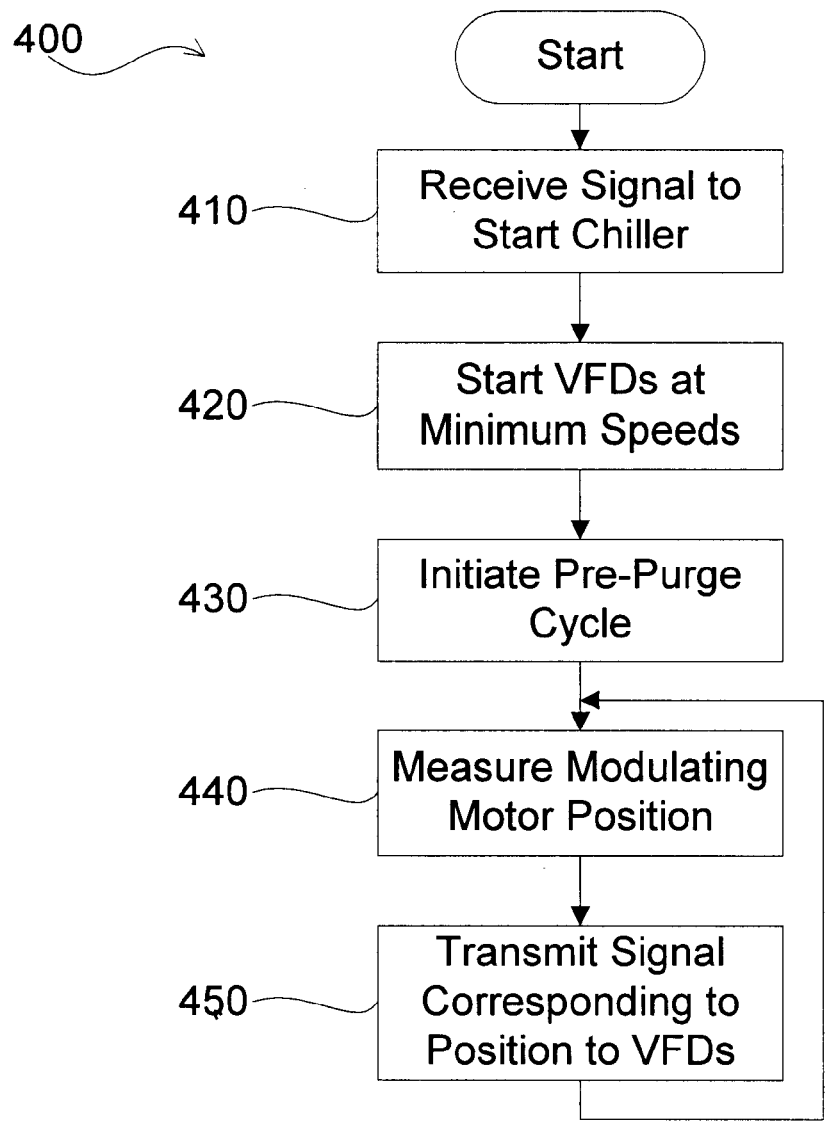
FIG. 4 is a flowchart illustrating a method of employing a chiller system according to an embodiment of the invention.

FIG. 4 is a flowchart illustrating a method 400 of employing a chiller system 300 according to an embodiment of the invention. First, the chiller system 300 can receive (410) a signal to start up. The signal can be from an outside air thermostat or from a manual input. Next, the VFDs (such as VFDs 350 and 380) are started (420) at minimum speeds as programmed. These minimum speeds are required so that ice does not form within the chiller 310. Next, the pre-purge cycle is initiated (430). In an embodiment of the invention, during the pre-purge cycle, the VFDs 350 and 380 remain operating at minimum speeds since the burner 320 is not firing.

After the pre-purge cycle is completed, the position of the modulating motor of the burner 320 is measured (440) and a signal corresponding to the modulating motor position is transmitted (450) to the VFDs 350 and 380. In an alternative embodiment, the position of an energy input valve of the burner 320 can be measured (440) and a signal corresponding to the energy input valve can be transmitted (450) to the VFDs 350 and 380. The VFDs 350 and 380, in turn, ramp up or down corresponding to the cooling load as indicated by the modulating motor position (or energy input valve position). The measuring (440) and transmitting (450) are repeated until the chiller system 300 is shut down, at which point the method 400 ends.

The foregoing description of the illustrated embodiments of the present invention is by way of example only, and other variations and modifications of the above-described embodiments and methods are possible in light of the foregoing teaching. For example, components of this invention may be implemented using a programmed general purpose digital computer, using application specific integrated circuits, or using a network of interconnected conventional components and circuits. Connections may be wired, wireless, modem, etc. Further, while the invention has been described in reference to a two stage chiller 300, other embodiments of the invention can use single or triple stage chillers. The embodiments described herein are not intended to be exhaustive or limiting. The present invention is limited only by the following claims.

What is claimed is:

1. A feedback system for use in a chiller system, comprising:
   a potentiometer capable of determining a characteristic of a burner coupled to a chiller, the characteristic corresponding to a cooling load of the chiller, and generating a signal corresponding to the determined characteristic; and
   a variable frequency drive capable of receiving, from the potentiometer, the signal corresponding to the characteristic, the variable frequency drive coupled to a pump coupled to the chiller.

2. The feedback system of claim 1, wherein the variable frequency drive is capable of ramping up or down in proportion to the signal.

3. The feedback system of claim 1, wherein the chiller includes an absorption chiller.

4. The feedback system of claim 1, wherein the chiller includes a centrifugal chiller.

5. The feedback system of claim 1, wherein the characteristic is directly proportional to the cooling load.

6. The feedback system of claim 1, wherein the potentiometer is capable of determining a position of a modulating motor of the burner.

7. The feedback system of claim 1, wherein the potentiometer is capable of determining a position of an energy input valve of the burner.

8. The feedback system of claim 1, wherein the pump includes a chilled water pump.

9. The feedback system of claim 1, wherein the pump includes a refrigerant pump.

10. The feedback system of claim 9, wherein the refrigerant includes cooling water.

11. A chiller system, comprising:
    a chiller having a chilled water input and a cooling water input;
    a burner coupled to the chiller;
    a first variable frequency drive and pump coupled to the chilled water input;
    a second variable frequency drive and pump coupled to the cooling water input;
    a feedback system coupled to the burner, the first variable frequency drive, and the second variable frequency drive, the feedback system capable of measuring a characteristic of the burner that is proportional to the cooling load of the chiller system and transmitting a signal corresponding to the determined characteristic to the first and second variable frequency drives.

12. The system of claim 11, wherein the feedback system includes a potentiometer that is capable of determining a position of an energy input valve of the burner.

13. The system of claim 11, wherein the feedback system includes a potentiometer that is capable of determining a position of a modulating motor of the burner.

14. The system of claim 11, wherein the chiller includes an absorption chiller.

15. The system of claim 11, wherein the chiller includes a centrifugal chiller.

16. A system, comprising:
    means for determining a characteristic of a burner coupled to a chiller, the characteristic corresponding to a cooling load of a chiller; and
    means for transmitting, to a variable frequency drive, a signal corresponding to the characteristic, the variable frequency drive coupled to a pump coupled to the chiller.

17. A feedback system for use in a chiller system, comprising:
    a sensor capable of measuring chilled water temperature before input to a chiller and generating a signal corresponding to the measured temperature, the temperature corresponding to a cooling load of the chiller; and
    a variable frequency drive capable of receiving, from the sensor, the signal corresponding to the measured temperature, the variable frequency drive coupled to a pump coupled to the chiller.

18. A method, comprising:
    determining a characteristic of a burner coupled to a chiller, the characteristic corresponding to a cooling load of a chiller; and
    transmitting, to a variable frequency drive, a signal corresponding to the characteristic, the variable frequency drive coupled to a pump coupled to the chiller.

19. The method of claim 18, wherein the variable frequency drive is capable of ramping up or down in proportion to the signal.

20. The method of claim 18, wherein the chiller includes an absorption chiller.

21. The method of claim 18, wherein the chiller includes a centrifugal chiller.

22. The method of claim 18, wherein the characteristic is directly proportional to the cooling load.

23. The method of claim 18, wherein the determining includes determining a position of a modulating motor of the burner.

24. The method of claim 18, wherein the determining includes determining a position of an energy input valve of the burner.

25. The method of claim 18, wherein the pump includes a chilled water pump.

26. The method of claim 18, wherein the pump includes a refrigerant pump.

27. The method of claim 26, wherein the refrigerant includes cooling water.

28. The method of claim 18, further comprising fully opening a valve coupled to the chiller.

* * * * *